(12) United States Patent
Ippitsu

(10) Patent No.: US 6,233,496 B1
(45) Date of Patent: May 15, 2001

(54) FASHION DESIGN AND PRODUCTION SUPPORTING METHOD AND SYSTEM THEREFOR

(75) Inventor: Yoshimi Ippitsu, Kyoto (JP)

(73) Assignee: UPEPO, Inc., Kyoto (JP)

( * ) Notice: Subject to any disclaimer, the term of this patent is extended or adjusted under 35 U.S.C. 154(b) by 0 days.

(21) Appl. No.: 09/003,437

(22) Filed: Jan. 6, 1998

(30) Foreign Application Priority Data

Jan. 10, 1997 (JP) .................................................. 9-003394

(51) Int. Cl.<sup>7</sup> ............................... G06F 19/00; G06F 7/66
(52) U.S. Cl. ...................... 700/133; 700/130; 700/131; 700/132; 700/134; 700/135
(58) Field of Search .................................. 700/133, 130, 700/131, 132, 134, 135

(56) References Cited

U.S. PATENT DOCUMENTS

| | | | | |
|---|---|---|---|---|
| 4,170,883 | * | 10/1979 | Varner | 68/205 R |
| 4,740,214 | * | 4/1988 | McBride et al. | 8/561 |
| 5,195,043 | * | 3/1993 | Varner | 364/470.04 |
| 5,288,322 | * | 2/1994 | Hanna et al. | |
| 5,493,518 | * | 2/1996 | Keating | 364/578 |
| 5,825,652 | * | 10/1998 | LeBlond et al. | 364/470.03 |
| 5,877,966 | * | 3/1999 | Morris et al. | 395/500.05 |

* cited by examiner

Primary Examiner—Ayaz Sheikh
Assistant Examiner—Frantz B. Jean
(74) Attorney, Agent, or Firm—Armstrong Westerman Hattori McLeland & Naughton, LLP

(57) ABSTRACT

A fashion design and production supporting method which makes the processing steps from the fashion design to the creation of block copy films for plates used in the actual production efficient, which allows a trial sample to be made without making block copy films or templates for the actual production and which allows an amount of dyes used in the actual production to be reduced. After creating original data having data of a coloring boundary line and color data and applying a specified color in a color chart to the color data of each part, the specified color is converted into network points represented by the four fundamental colors and a color pattern is printed on a standard sheet by inks by using drawing means to evaluate it. After that, a cloth used for the actual production is dyed as a trial sample by the network points represented by the four fundamental colors and the block copy films are made after making and evaluating the trial sample. The present invention is characterized in that it allows these series of works to be processed within one system while linking the data.

17 Claims, 11 Drawing Sheets

FASHION DESIGN AND PRODUCTION SUPPORTING METHOD AND SYSTEM THEREFOR

BACKGROUND OF THE INVENTION

1. Field of the Invention

The present invention relates to a method and a system which allow a design to be evaluated appropriately and a series of processing steps from the planning to the actual production of a fashion design to be processed in linkage within one and the same office, thus allowing the time, labor and cost which have been spent for such processing steps to be reduced considerably and products sensitive to trends to be developed quickly. In addition to that, the present invention relates to a technology which allows the production cost to be reduced considerably and the apprehension for the environmental pollution to be relaxed considerably by allowing dyes used in the actual production to be saved considerably.

2. Description of Related Art

In the fashion industry, it is very important to improve the design development speed how to develop a design quickly in anticipation of the fashion, to enhance the linkage among each processing step from the design development to the actual production by quickly and efficiently connecting the developed product design to the actual production and to reduce the cost of the actual production to maintain competitive power within the industry. In addition to that, dyes discharged to the realm of nature during the actual production has been posing a problem of environmental pollution and it has become an important subject how to reduce the disused dyes in recent years.

Hitherto, the most of the processing steps from the planning of a fashion design to the actual production rely on manual works except of the actual production process. For instance, in planning a fashion design, designs such as a style and a color pattern of a dress which a designer has sketched are checked and corrected on papers to narrow down to several hopeful designs. Then, trial samples are made from the several designs thus narrowed down to be evaluated by a client and only one evaluated highly by the client is actually produced.

Such method, however, has had the following problems.
1) Because the design has been checked while applying color patterns to the sketch of the dress and thinking of the finished state on papers, no actual feeling was obtained, the design could not be evaluated precisely and the development speed was slow.
2) An actual production has been necessary to obtain a cloth for the trial sample, even if it is a small lot, so long as the cloth having the same pattern with the actual product is used. Therefore, while a template for screen printing used in the actual production is required and a certain amount of cloth for the trial sample needs to be actually produced, they all become useless when the design is not adopted, though their cost will be reflected in the production cost.

Beside these problems concerning to the planning of the fashion design, there have been the following important problems.
3) While a color pattern is dyed across the whole cloth in screen printing in the actual production as a matter of course, the remaining part of the cloth after cutting the dress pattern is disused, so that the dyes at this part become useless and the disused dyes may pollute the environment.

Thus, there have been various problems in the prior art processing steps from the design and planning of a fashion to the actual production that the design cannot be evaluated precisely and the design development speed is slow, that the raw materials, time and labor are wasteful, becoming a factor of increasing the production cost and that the disused dyes may cause the environmental pollution.

While there exists a system which allows a design edited on a display screen to be output by a color copier by connecting the color copier to a computer in the field of design development, this system allows the design to be output only on a paper or a film. Accordingly, it has been necessary to implement the actual production after making plates for screen printing as usual in order to obtain trial samples. Still more, because the color copier is extremely expensive, it costs a lot to introduce it and it has been difficult to introduce it by small companies.

Accordingly, the present invention has been devised in view of such situation and has been intended to provide a fashion design and production supporting method and a system therefor which allow designs to be evaluated precisely, the design development to be quickened, the cost of the product to be lowered by eliminating the waste of the raw materials, time and labor and the environmental pollution to be suppressed and which can be introduced at low cost.

SUMMARY OF THE INVENTION

The inventors et., al. have obtained the following ideas as a result of extensive study implemented to solve the above-mentioned problems. Because a color pattern of a cloth may be simulated on a computer while displaying them on a display screen, there is a possibility that a trial sample can be made within an office if there exists a drawing system which allows the simulated color pattern to be directly dyed on a cloth used for the actual production. Then, studyeing specifically on this point, the inventors obtained a conviction that this problem can be solved by improving an ink jet type plotter or the like. However, there remained various problems to be overcome.

A first problem was how to reproduce a color which a client desires (hereinafter referred to as a desired color) faithfully on the cloth. The inventors considered that this problem can be solved basically by selecting a color close to the desired color from a color chart to replace the desired color by the specified color (hereinafter the color specified in the color chart will be referred to as a specified color) and by converting the selected specified color into the representation of network points by the four fundamental colors of CMYB of cyan, magenta and yellow, i.e. the three primary colors, and black. A method for converting from the specified color to the four fundamental colors of CMYB has been established as a known technology, so that it can be used in this case.

A second problem was a problem that no established standard exists for evaluating a color pattern because a tint realized on a sheet member by the drawing system depend on inks and dyes to be used and types of the sheet member. For instance, while the color pattern needs to be evaluated by dyeing directly on the cloth used for the actual production in the end, it is needless to say that it is preferable to print it out on papers whose cost is low and which can be readily handled in the stage of trial-and-error before reaching to the final stage. However, the tint to be reproduced changes every time and the color pattern cannot be evaluated precisely if the quality of the papers to be used is not unified. Then, the inventors have set a standard sheet of paper to evaluate the color pattern on the sheet of paper.

By the way, a color curve per dye material is necessary basically in order to convert the selected specified color into the representation of network points by the four fundamental colors of CMYB because coloring of different dye is different. However, there have been problems to set the color curve per each dye that it requires a lot of works and that the handling of the data is cumbersome. This problem has been solved by causing the tint of each color of different dyes or of dye and ink to coincide, respectively, as much as possible. In this case, while it is preferable to cause the tint printed out on the standard sheet to coincide with the tint dyed on the cloth used for the trial sample, there is a case when the tint of ink itself before printing just needs to be caused to coincide with the tint of the dye itself before dyeing.

It allows the different dyes to be dealt just by one color curve and eliminates the need of distinguishing ink from dye. That is, it allows the whole things to be dealt just by one color curve.

A third problem was how to realize such high functional and easy-to-handle system while keeping its cost as low as possible, without complicating the system structure and without degrading the maintainability.

As for the system cost at first, the parts were made common by using general purpose parts as much as possible. As for the system for drawing on a sheet member which occupies a large weight in the overall cost, the inventors aimed at using various dye and ink output mechanisms in common. In concrete, an injection nozzle and peripheral mechanism thereof which are expensive parts were arranged to be used in common. However, the physical and chemical characteristics of dye are normally diffrent from those of ink. Further, even among dyes, their physical and chemical characteristics are different when their type is different. Accordingly, the injection nozzle and the peripheral mechanism thereof cannot be used in common as they are. Then, the present invention made it possible to use the injection nozzle and the peripheral mechanism thereof in common by causing the physical and chemical characteristics of various dyes and inks to coincide as much as possible.

Before explaining the contents of the present invention completed based on such ideas, words which will be used often in the present invention will be defined as follows for the purpose of avoiding any confusion.

- Tint: A state or degree of a color and a concept including hue and color tone;
- Feeling: Touch or visual feeling of a cloth;
- Desired Color: A color which a client desires;
- Specified Color: A color specified on a color chart;
- Color Pattern: What a color is given to a pattern which is defined by a coloring boundary line;
- Pattern: What is removed a color from the color pattern and is almost synonymous with the coloring boundary line;
- Coloring Boundary Line: A boundary between colored faces. It is a part which appears to be a line. It is not controlled as line data necessarily within a computer;
- Three Primary Colors: Three primaries of coloring materials of cyan, magenta and yellow;
- Four Fundamental Colors: Four colors in which black is added to the three primary colors of coloring materials of cyan, magenta and yellow;
- Printing: To draw a color pattern or a pattern on a surface of a sheet member by using ink and is synonymous with "drawing";
- Dyeing: To dye a cloth by using dye;
- Textile Printing: To press-print a color pattern or the like on a cloth by using a plate;
- Ink: Colored liquid used in printing;
- Dye: Material for dyeing a cloth;
- Sheet Member: Paper, cloth, synthetic resin film and the like. Specifically, standard sheet, cloth or block copy film in the present invention;
- Color Subtraction: To reduce a number of colors. To reduce a number of colors contained in an original to a required number of colors in the embodiment of the present invention. "Required number of colors" here means a number of colors of dyes used in the textile printing in the actual production and that number of colors of dyes is determined normally from the aspect of cost;
- Color Separation: To separate an original per color composing it;
- Monotoning: To unify one represented by using a plurality of colors toga representation in monochrome. To unify colors of one separated per each color by the color separation into the same color in the embodiments of the present invention. Although they re unified into black in general, it is not necessary to limit only to black;
- Color Chart: A table in which color samples are arrayed systematically. Specifically, a table in which samples of colors which can be handle by the present supporting system are arrayed in the present invention. The concrete contents is determined by considering the output characteristics of the plotter and the display characteristics of the system in displaying on the display screen. It is noted that although the table is provided basically in the shape of a printed matter, one which is displayed on the display screen as a table is also included in this category;
- Full Color: Although it refers to 36,000,000 colors in general, a number of colors is not specifically limited in the present invention and one having more than four colors is considered to be an object thereof;
- Network Point: Points which are seen in a printed matter of an image having variable density, whose size is ambiguous by naked eyes and which are arrayed regularly or irregularly. A state of color is represented by a set of these points and it is synonymous with 'dot';
- Color Curve: A curve specifying the relationship between rates of the specified color selected from the color chart and the four fundamental colors of CMYB when the specified color is reproduced by the representation of network points by the four fundamental colors of CMYB. One group is composed of four curves for each color of CMYB. All of the color conversion is implemented by the group of color curves in the embodiment of the present invention. The whole or part of the color curves may be sometimes represented by functions or as a set of values specified by actual measurement;
- Data Table: A chart showing the relationship between data and is stored in a hard disk or in a memory. The contents thereof is the data of the color curves in the embodiment of the present invention and data of amount of inks or dyes of the four fundamental colors of CMYB to be injected reproducing each specified color in correspondence thereto is recorded;
- Color Matching: To cause colors to coincide or match from each other. To cause the specified color selected from the color chart to coincide or match with a color realized by the representation of network points of the four fundamental colors of CMYB;

Ground Pattern: A pattern across the whole cloth;

Cutting Pattern: Lines configuring cutting lines for obtaining each part for seaming a dress;

Plate Separation: To divide a color pattern composed of a plurality of colors per color. A case of separating a cutting pattern accompanying a color pattern created on a computer per color is mainly explained in the embodiment of the present invention. In this case, a dyeing pattern which reflects the cutting pattern is drawn on the separated plate;

Dyeing Pattern: A pattern drawn on a block copy film created per each specified color or a pattern specifying a part where the specified color is dyed. What the dyeing patterns are overlapped corresponds to the cutting pattern; and Maintenance: Maintenance of the computer or the plotter required for keeping their performance. Specifically, it is important to maintain well the injection nozzle and surroundings thereof of the plotter in the inventive system.

The invention described in claim 1 and completed based on such ideas is a fashion design and production supporting method comprising steps of:

creating data of a coloring boundary line of a pattern and original data in which color data is given to each part of the pattern by coloring a selected and specified color within a region delimited by the coloring boundary line;

converting the color data of each specified color colored to each part of the pattern into data of network points represented by the four fundamental colors of cyan, magenta, yellow and black in order to reproduce the specified color of each part of the pattern on a sheet member by using a drawing unit having a system of representing halftones on the sheet member by congregating the four fundamental colors in the shape of the network points, printing a color pattern on a standard sheet for evaluating color patterns in the exact size by using inks of the four fundamental colors in accordance to the data and defining the color pattern on the standard sheet after evaluating the color pattern printed on the standard sheet;

creating a cutting pattern of a dress using the defined color pattern as a ground pattern;

converting the color data of each specified color colored in each part of the pattern into the data of network points represented by the four fundamental colors to dye the color pattern and the cutting pattern on the same cloth with that used in the actual production in the exact size by using dyes of the four fundamental colors in accordance to the data of the network points, the data of the cutting pattern and data of size of the dress while dyeing only the inside of an outline of the cutting pattern and without dyeing the outside thereof;

making a trial sample by cutting and seaming the cloth thus dyed;

defining the cutting pattern and color pattern after evaluating the trial sample thus made and preparing block copy films for textile printing in the actual production, each of which is printed by color-separating and monotoning the original data per each specified color based on a number of colors contained in the original data and in which the cutting pattern is reflected, by the same number with the number of colors contained in the original data by using the drawing unit; and making plates for screen printing in the actual production by using the block copy films and dyeing only the inside of the outline of the cutting pattern without dyeing the outside by using those plates in the actual production.

As a method for representing the specified color by a set of network points (dots) by the four fundamental colors of CMYB, there are cases of unifying the size of each network point and of differentiating the size of the network points. When the size of the network point is the same, the concentration is represented by the density of the network points and when the size of the network point is differentiated on the other hand, the concentration is represented by the density of disposed network points occupied per unit area.

The original data may be created by reading from an existing sample, not creating all the data from the beginning, by using a scanner, a digital camera and the like. The data to be read may be apart or the whole. In this case, the original data creating step is carried out as follows.

That is, the step of creating the original data comprises steps of reading a color pattern of a sample to be referenced in full color by an image reader to create data of a coloring boundary line from the color pattern thus read, subtracting a number of colors in the full color state colored within the region delimited by the coloring boundary line to a number of colors which can be handled and specifying specified colors close to the colors after the subtraction to give color data to each part of the pattern. When the specified color is to be specified automatically by the computer itself without requiring man-power, a color represented on the display by the three primary color lights of red (R), green (G) and blue (B) is converted to the four fundamental colors of CMYB.

It is practical to specify the specified color by selecting from the color chart in which limits a number of colors. It is conceivable to select the specified color after displaying the specified colors on the display screen. However, it is necessary to convert into the four fundamental colors of CMYB because it is displayed on the display screen by the RGB method in this case. The conversion from the color data of the specified color to the representation of network points represented by the four fundamental colors of CMYB, i.e. the color matching, may be carried out practically by preparing the color matching data table beforehand to convert the color by making reference to the data table from the aspect of processing speed. However, the present invention also includes a method of running the conversion from the specified color to the network point representation of the four fundamental colors of CMYB by means of calculation.

In the invention described in claim 1, the operation for converting the specified color into the network points represented by the four fundamental colors of CMYB is done twice, i.e. when printing on the standard sheet for evaluating color patterns using inks and when printing on a cloth used for a trial sample by using dyes. Although the color matching data may be provided independently for each of the ink and dye, it is convenient to be able to use it in common. In order to make it possible, a tint of each color ink used for printing on a standard sheet must be made to coincide with a tint of each color dye used in dyeing on the cloth used for the trial sample as much as possible. In this case, although it is preferable to make the tint of the ink in the state printed out on the standard sheet to coincide with the tint of the dye in the state dyed on the cloth for trial sample, there is a case when it is just necessary to make the tint of the ink itself before printing to coincide with the dye itself before dyeing.

Further, it is proposed to provide both the four colors of inks for printing on the standard sheet and the four colors of dyes for dyeing the cloth in one drawing unit and to inject the same color ink and dye from a common injection nozzle in order to reduce the cost and size of the system without complicating the system structure.

It is also preferable to use light intercepting ink used in preparing block copy films in common as black ink among the inks for printing the standard sheet. The ink must be satisfactory in both cases when it is used as the ink for printing the standard sheet and as the ink for printing the block copy film in order to be used for the standard sheet and the block copy film. As a result of study, the inventors had found that the light intercepting ink used for the block copy film might be used also as the black ink for printing the standard sheet. Then, the inventors made it possible to use the light intercepting ink for printing the block copy film also as the ink for printing the standard sheet in common. The light intercepting ink used in the present invention is what can clearly and faithfully reproduce the color pattern even when it is used as the black ink among the four fundamental colors of CMYB while having the light intercepting function.

In the supporting method described above, the color pattern reproduced and defined on the standard sheet by using the inks of the four fundamental colors of CMYB becomes the standard in the processing steps thereafter. That is, conditions for dyeing on the cloth used for the trial sample using dyes of the four fundamental colors of CMYB and dyeing conditions in textile printing of the actual production are determined based on the color pattern reproduced and defined on the standard sheet.

The dyes for dyeing the cloth for the trial sample are selected corresponding to types of the cloth. For instance, acidic dye is used when the cloth is silk, nylon textile and wool textile, disperse dye is used when the cloth is polyester textile, reactive dye is used when the cloth is cotton, rayon textile and hemp textile and cation dye is used when the cloth is acrylic textile. It is noted that the relationship between the textiles and dyes described here is what has been clarified in the present moment and is not fixed. For the textiles to be developed for the future, dyes corresponding thereto will be selected among the existing dyes or dyes to be developed newly.

While the four fundamental colors of CMYB are normally used in printing on the standard sheet and dyeing on the cloth for the trial sample, there is a case when it is impossible to deal only with the four fundamental colors of CMYB when a quiet color needs to be added to part of a color pattern whose overall tone is flashy for example. In this case, it is conceivable of adding a single or a plurality of special colors other than the four fundamental colors of CMYB.

Although the cutting pattern used in dyeing on the cloth for the trial sample is reflected also on the block copy films, the color pattern and the cutting pattern are dyed together in the textile printing in the actual production and only the inside of the outline of the cutting pattern is dyed in the method described above, another method is also conceivable. That is, it is to use the cutting pattern only in dyeing the cloth for the trial sample and to dye the color pattern across the whole cloth as usual without drawing the cutting pattern in the textile printing of the actual production.

A supporting system described in claim 13 as a concrete system for realizing such fashion design and production supporting method comprises:

means for creating data of a coloring boundary line of a pattern and original data in which color data is given to each part of the pattern by coloring a selected and specified color within a region delimited by the coloring boundary line;

a drawing unit, having a system of representing halftones on a sheet member by congregating the four fundamental colors of cyan, magenta, yellow and black in the shape of network points and carrying inks of four fundamental colors for printing on a standard sheet for evaluating color patterns and dyes of four fundamental colors for dyeing a cloth, for drawing on the sheet member by switching and injecting the same color ink and dye through a common nozzle;

color converting means, having a color matching data table for representing the specified color by the network points represented by the four fundamental colors of CMYB, for converting each specified color into data of an amount of ink and dye of four fundamental colors to be injected by making reference to the data table;

cutting pattern creating means for creating a cutting pattern of a dress in which the original data created by the original data creating means and defined through the evaluation of the color pattern on the standard sheet is used as the ground pattern; and display means for displaying on a screen the whole or part of the process for creating the original data by the original data creating means, the color conversion process by the color conversion means and the process for creating the cutting pattern by the cutting pattern creating means.

The original data creating means comprises an image reader for reading a color pattern of a sample in full color; and a mechanism for creating data of a coloring boundary line prom the color pattern thus read and subtracting a number of colors in the full color state colored within a region delimited by the coloring boundary line to a number of colors which can be handled to specify a specified color close to a color after the subtraction. The "specifying mechanism" here refers to a mechanism in which the computer analyzes the colors after the color subtraction to specify the specified color which the client desires on the color chart.

It is desirable to cause the tint of each color ink used in printing on a standard sheet for evaluating color patterns to coincide with the tint of each color dye used in dyeing on the cloth as much as possible and to use color matching data used in printing on the standard sheet also as color matching data used in dyeing on the cloth. The tints to be caused to coincide are that after the printing on the standard sheet and that after the dyeing on the cloth for the trial sample. It is noted that there is also a case when the tint of the ink itself before printing is made to coincide with the tint of the dye itself before dyeing.

Further, it is preferable to provide both the inks of the four fundamental colors for printing the standard sheet and the dyes of the four fundamental colors for dyeing the cloth in one drawing unit and the same color ink and dye are injected from a common injection nozzle.

It is also desirable to use the light intercepting ink used in creating block copy films in common as the black ink among the inks for printing the standard sheet.

The processes from the planning to the actual production of the fashion design are carried out as follows by using the supporting system described in claim 13.

(1) Original data of a color pattern is created by the original data creating means based on a concept of making a dress having what kind of color pattern. As a method for creating the original data, there is a method of creating data of a coloring boundary line (synonymous with data of pattern) within the computer and then selecting desirable specified colors from the color chart for each part within the coloring boundary line to specify to the computer. There is also a method of reading the color pattern from a sample by using an image scanner, a digital camera and the like and subtracting the color pattern read in the full color state to apply the specified color selected by the client from the color chart to the color after the subtraction or to automatically convert the color of each part of the color pattern represented by RGB on the display screen into the four fundamental colors of CMYB by the computer.

(2) After obtaining an outline image, the standard sheet for evaluating the color pattern is set in the plotter B to print in the exact size by using the inks for printing the standard sheet. Then, it is confirmed whether the color pattern thus printed out conforms to the requirement of the client. When it conforms, the color pattern is defined and if not, the color, pattern and structure are corrected repeating the same procedure until the color pattern conforming to the requirement is obtained. The color pattern is printed on the standard sheet by converting each specified color colored in each part of the pattern in the original data into the network points represented by the four fundamental colors of CMYB. The network point representation is implemented by equalizing the size of each network point or by differentiating the size of each network point. When the size is equal, the concentration is represented by the density of disposed network points and when the size is differentiated, the concentration is represented by a rate of an area occupied by the network point per unit area.

The conversion from the specified color to the network points represented by the four fundamental colors of CMYB is implemented by making reference to the color matching data of the appropriate specified color from the data table registered in advance. This color matching data is represented by four color curves which specify amounts of inks or dyes of the four fundamental colors of CMYB to be injected. While there is a case when the part or the whole of the color curve can be expressed by a function, the amounts of inks of the four fundamental colors of CMYB to be injected, reproducing each specified color, are specified by actually measured data and the like and the contents thereof is represented by numerical data in most of the cases. A set of this numerical data is the data table.

The color matching data which has been made reference here is used also in dyeing the cloth for the trial sample later in the supporting system described in claim 14.

(3) When the color pattern is defined, cutting patterns of the dress are created using the color pattern as the ground pattern. Then, the color data of the specified color colored to each part of the pattern in the original data is converted to the network points represented by the four fundamental colors of CMYB. Although the color matching data peculiar to the dye set in consideration of the dye material and cloth material may be used in the conversion, the color matching data in printing on the standard sheet may be used in common when the tint of each color dye is made to coincide with each color ink for printing on the standard sheet as much as possible as described in claim 15. only the inside of the outline of the cutting pattern is dyed and the outside thereof is not dyed.

(4) The dyed cloth is cut and seamed in accordance to the pattern to create the trial sample.

(5) The trial sample is evaluated and is discussed whether or not to put on the actual production line. When it is determined to put on the actual production line, a block copy film used in the textile printing in the actual production is prepared per each specified color by color-separating the original data per each specified color based on a number of colors contained in the original data. A number of the block copy films coincides with the number of specified colors defined in the original data creating step. For instance, although it may be considered to prepare a plurality of block copy films for the same specified color, it is worthless industrially because it may become a factor of increasing the cost. Accordingly, considering the textile printing cost, it is preferable to cause the number of block copy films to coincide with the number of specified colors.

A dyeing pattern is drawn on the block copy film. The dyeing pattern is a pattern dyed per each specified color in the textile printing in the actual production. What the dyeing patterns are superimposed corresponds to the cutting pattern. The dyeing pattern is created on the block copy film so that only the inside of the outline of the cutting pattern is dyed and the outside thereof is not dyed. If the effect of reducing an amount of dye used is not required, a block copy film which is intended to be used in dyeing solidly across the whole cloth may be prepared as usual.

Although the light intercepting ink used in preparing the block copy film may be provided independently, it needs not be provided independently by using the four fundamental colors of CMYB as the ink for printing the standard sheet and by using the light intercepting ink as black ink of them. While the light intercepting ink used in the present invention has the light intercepting effect and may be fixed well on the block copy film, it can guarantee the satisfactory coloring as the black ink when it is used as the black ink among the four fundamental colors of CMYB.

(6) The block copy films thus finished are handed to a platemaker to make plates for screen printing in the actual production. There is also a case when the data for preparing the block copy films is sent directly to the platemaker or a textile printing shop, without preparing the block copy films.

(7) The dyeing process as the actual production is carried out in the textile printing shop by using the finished plates for textile printing. The standard sheet printed out for evaluating the color pattern has been handed to the textile printing shop and workers of the shop prepare the dyes by making reference to the color pattern sample printed out in the standard sheet. Preparing the dye in accordance to the color pattern printed out on the standard sheet allows the cloth dyed in the color pattern having an image close to the original is finished. Only the inside of the outline of the cutting pattern is dyed and the outside thereof is not dyed in the actual production. It is needless to say that the whole cloth may be dyed as usual if the effect of reducing the amount of dye used is required.

Thereby, the use of the inventive supporting system allows the processing steps other than the final actual production step to be implemented while displaying the predicted drawings of finish on the image display means (display unit) and while discussing among staffs.

The specific nature of the invention, as well as other objects, uses and advantages thereof, will clearly appear from the following description and from the accompanying drawings.

BRIEF DESCRIPTION OF DRAWINGS

FIGS. 1a and 1b show an embodiment of a support system of the present invention, wherein FIG. 1a shows the whole structure of the support system composed of a computer and a plotter and FIG. 1b shows another example of the plotter;

DESCRIPTION OF PREFERRED EMBODIMENTS

Figure 1A:
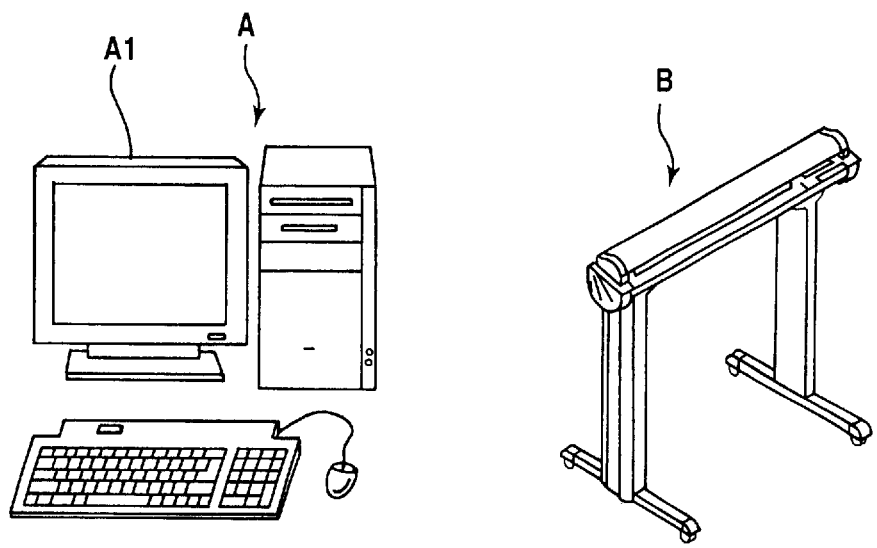

The present invention will be explained below in detail based on embodiments shown in the drawings.

FIG. 1a shows a general view of one embodiment of the inventive system. The inventive system comprises mainly a computer A and an ink jet type plotter B. The computer A is a general purpose personal computer provided with a high resolution display A1. Original data creating means, color conversion means, cutting pattern creating means and color separation and monotoning means which are components of the inventive system are structured by software. These means may be structured also by hardware by using dedicated circuits.

Figure 2:
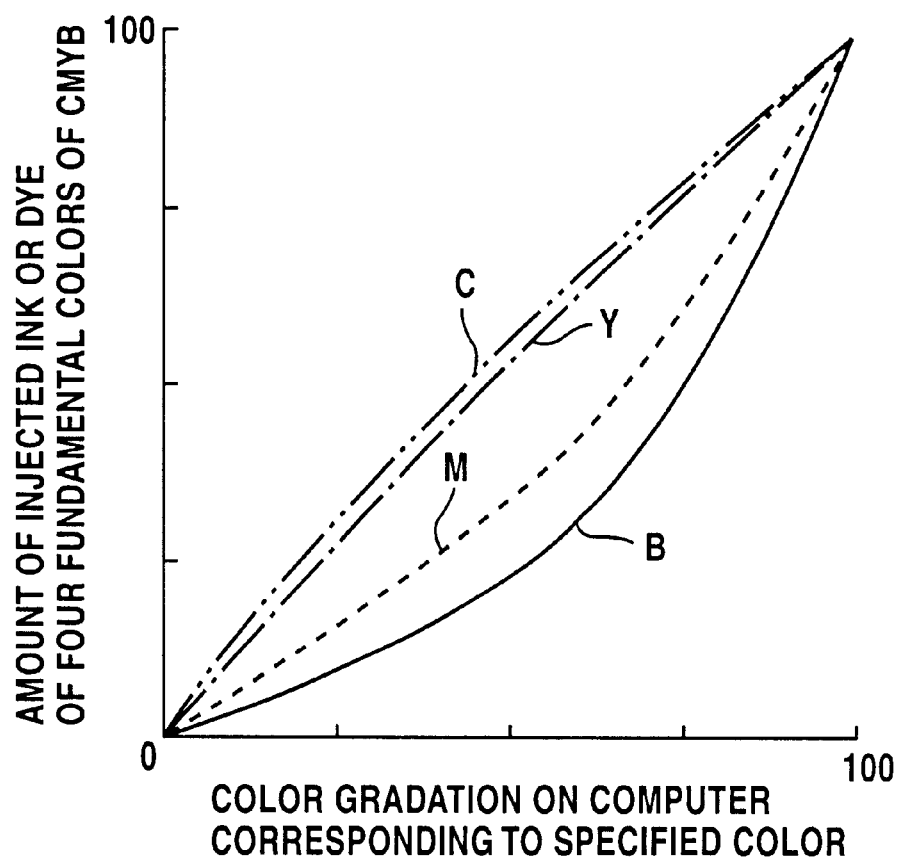
FIG. 2 is a graph showing relationships (color curves) between color gradation (concentration) of specified colors on a computer and amounts of inks or dyes of four fundamental colors of CMYB to be injected.

Color matching data for converting color data of a specified color into the network points represented by the four fundamental colors of CMYB is stored within a hard disk built in the computer A. The color matching data is represented as a graph as shown in FIG. 2. When the horizontal axis is a color gradation on the computer corresponding to the specified color, an amount of ink or dye of the four fundamental colors of CMYB to be injected necessary for realizing this color (synonymous with the color gradation) by the network points represented by the four fundamental colors of CMYB is represented by the vertical axis.

The plotter B is arranged so as to be able to draw a color pattern on a sheet member while feeding a sheet member wound in a roll by reciprocating an injection nozzle in the direction orthogonal to the direction in which the sheet member is fed. It is arranged so as to be able to handle papers, cloths and films as the sheet member and to inject ink or dye while switching them from the injection nozzle.

Figure 1B:
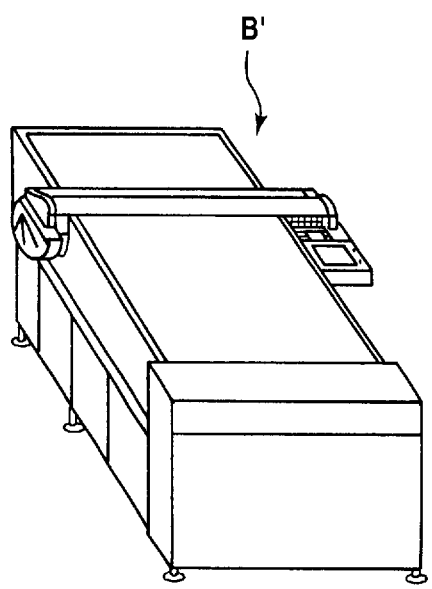

A so-called flat bed type plotter B' in which the injection nozzle is provided movably both in the vertical and horizontal directions with respect to the sheet member on a flat bed on which the sheet member can be placed while spreading it as shown in FIG. 1b may be used as the plotter. It is noted that although not shown, other ink jet type plotter or plotters other than that of the ink jet type may be used so long as it can inject ink and dye and can print on a standard sheet and dye on a cloth.

Figure 3:
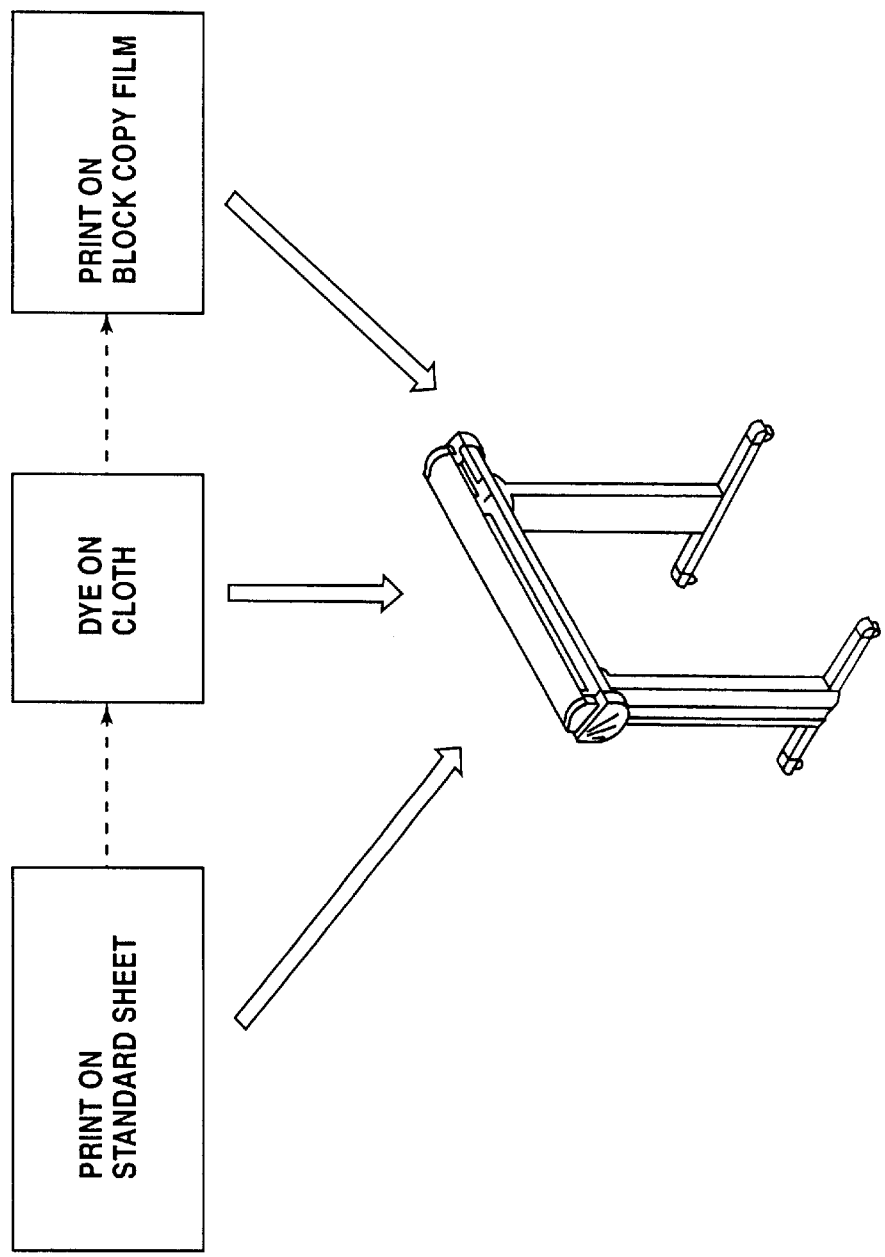
FIG. 3 is an explanatory drawing showing that the plotter is commonly used for printing on a ms and for dyeing on a cloth and for printing on a block copy film.
Figure 4:
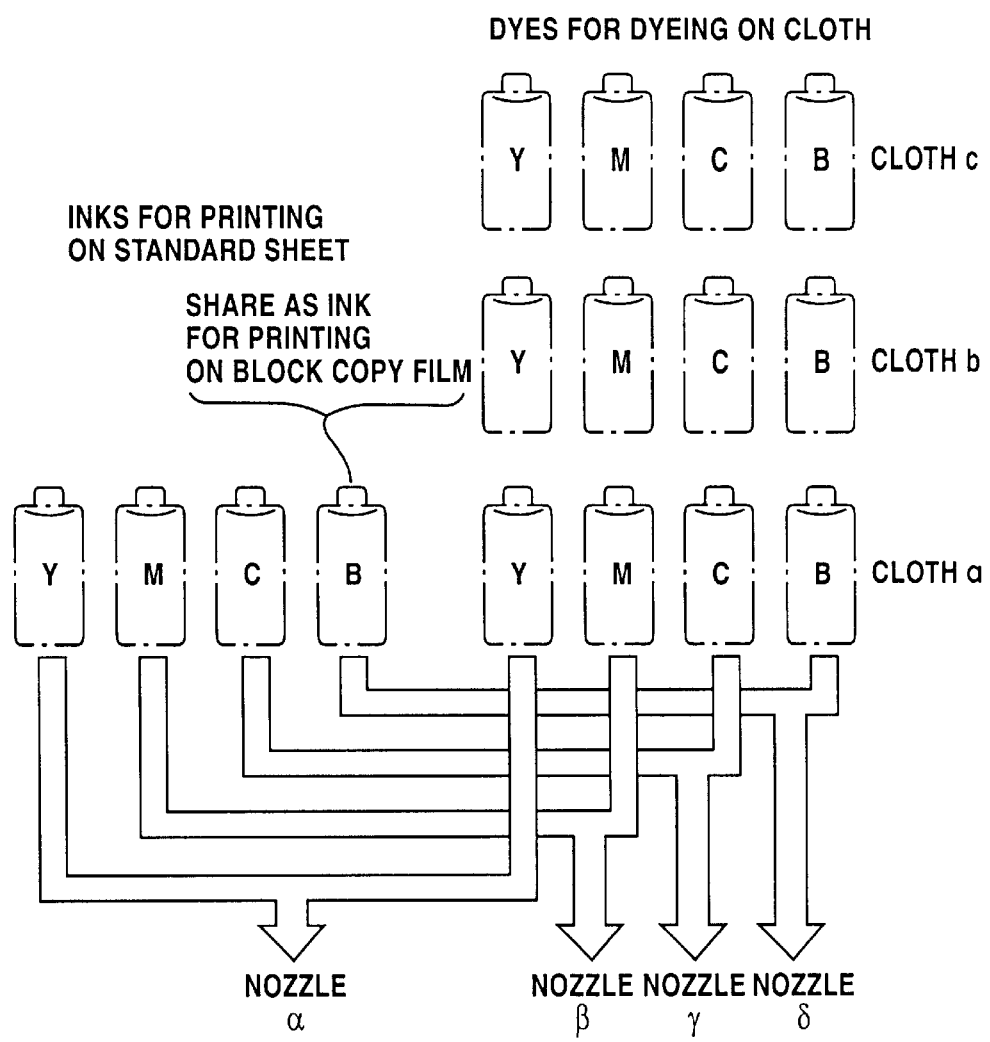
FIG. 4 is an explanatory diagram showing that inks of the four fundamental colors of CMYB and dyes of the four fundamental colors of CMYB are mounted in the plotter in the same time.

As shown in FIG. 3, the plotter is provided with dedicated tanks for inks for printing the standard sheet and dedicated tanks for dyes for dyeing a cloth used for trial samples as shown in FIG. 4 in order to process all the processes of printing on the standard sheet, of dyeing on the cloth and of printing on the block copy film by one set. Both inks and dyes are those of four fundamental colors in which black is added to the three primary colors of coloring materials of cyan, magenta and yellow inks and dyes and half tone is represented by the network point representation using those four fundamental colors of CMYB. The plotter is provided with eight dedicated tanks in total.

Black light intercepting ink for printing the block copy film is used for the black ink among the inks for printing the standard sheet. Thereby, the light intercepting ink may be shared for printing the block copy film in monochrome and for printing the standard sheet in color and it is not necessary to provide an ink tank for printing the block copy film separately.

The dyes for dyeing a cloth may be replaced corresponding to the type of the cloth. For instance, acidic dye is used for silk, nylon textile, wool textile, disperse dye is used for polyester textile, reactive dye is used for cotton, rayon textile and hemp textile and cation dye is used for acrylic textile. While these dyes are replaced corresponding to cloths to be used a, b and c as shown in FIG. 4 for example, the injection nozzles α, β, χ, and δ for injecting these different kinds of dyes are used in common per each color.

The injection nozzles α, β, χ, and δ are used in common not only for the different kinds of dyes but also for the inks for printing the standard sheet. Accordingly, one plotter B is provided with four injection nozzles in total by one each for four colors of cyan, magenta, yellow and black. By the way, physical and chemical characteristics of ink and dye differ depending on their type. For instance, while liquid ink or dye is injected by instantly foaming in the ink jet type injection nozzle, heating and pressurizing conditions for forming are different between the ink and dye or even between dyes when their type is different. Due to that, even if the injection nozzle is used in common for ink and dye or for dyes of different type, heating and pressurizing conditions do not meet with those for injecting the dye when they are adjusted for the ink and the heating and pressurizing conditions do not meet with those for injecting one dye among different dyes when they are adjusted for the other as a result. Then, the ink and dye which do not meet with those conditions evaporate excessively, coagulate and clog the nozzle. Therefore, it becomes impossible to inject them and the injection nozzle cannot be used in common as it is. The present embodiment allows the injection nozzle to be used in common by developing inks and dyes for which heating and pressurizing conditions during injection, which have been different among inks and different dyes, are equalized.

Thereby, using the injection nozzle in common allow the number of injection nozzles which is an expensive part to be reduced and thus the cost to be reduced. It also allows the condition for printing on the standard sheet and the condition for dyeing on the cloth by dye to be unified and the printed result on the standard sheet to be matched with the dyed result on the cloth.

Another measure is taken in the present embodiment in order to simplify the system structure and to guarantee that the printed result on the standard sheet always has the same tint with that of the dyed result on the cloth. It is to cause the tone and hue which are the tint of each color of the ink of the four fundamental colors of CMYB used in printing on the standard sheet for evaluating color patterns to coincide with tone and hue of each color of the dye of the four fundamental colors of CMYB used in dyeing on the same cloth with those actually produced as much as possible and to use color matching data which is referenced in printing on the standard sheet for evaluating color patterns in dyeing on the cloth. This color matching data is used in common also for different kinds of dyes. Here, the tint of each color of the ink for printing the standard sheet and the tint of each color of the dye used in dyeing the cloth for the trial sample must be caused to coincide with that printed out on the standard sheet and that dyed on the cloth for the trial sample as much as possible. Because coloring is different before and after "steaming" for dyes which require "steaming" before dyeing, it is meaningless to guarantee the coincidence of the hue with the dye before "steaming". Further, the coloring is different also depending on the quality and ground color of the cloth to be dyed. However, there is a case when it will do as long as the coincidence of each color of ink before printing with each color of dye is assured when a dye whose color will not change before and after dyeing and when the cloth to be dyed has a color close to the standard sheet.

It thus became possible to match the result of printing on the standard sheet with the result of dyeing on the cloth thereafter without complicating the system structure by using the color matching data in common after equalizing the tint of each color ink and each color dye or each color of different kinds of dyes as much as possible. That is, it became possible to estimate and evaluate the color pattern dyed on the cloth by evaluating the color pattern on the standard sheet.

Figure 5:
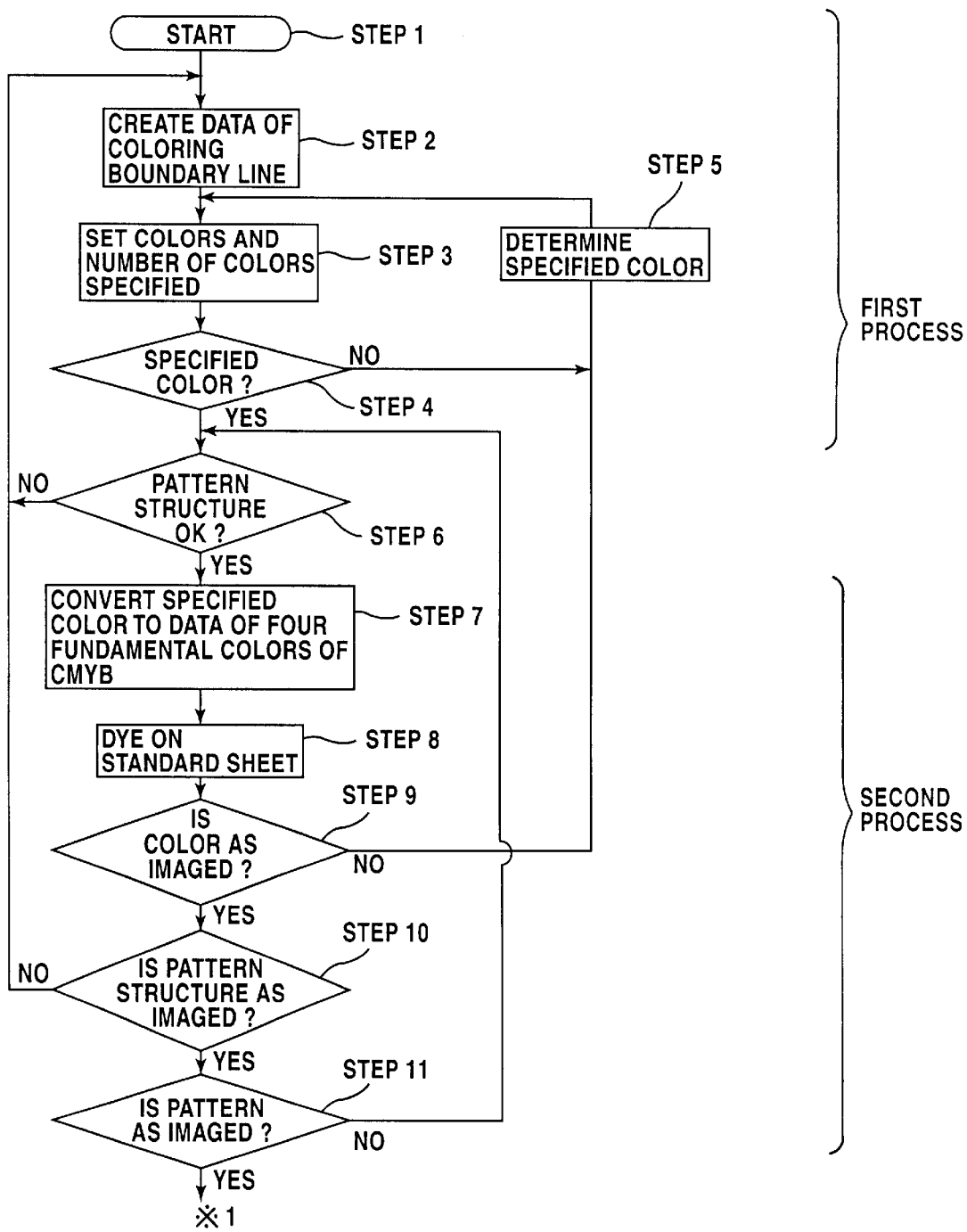
FIG. 5 is a part of a flow chart showing a procedure according to one embodiment of the inventive fashion design and production supporting method.
Figure 6:
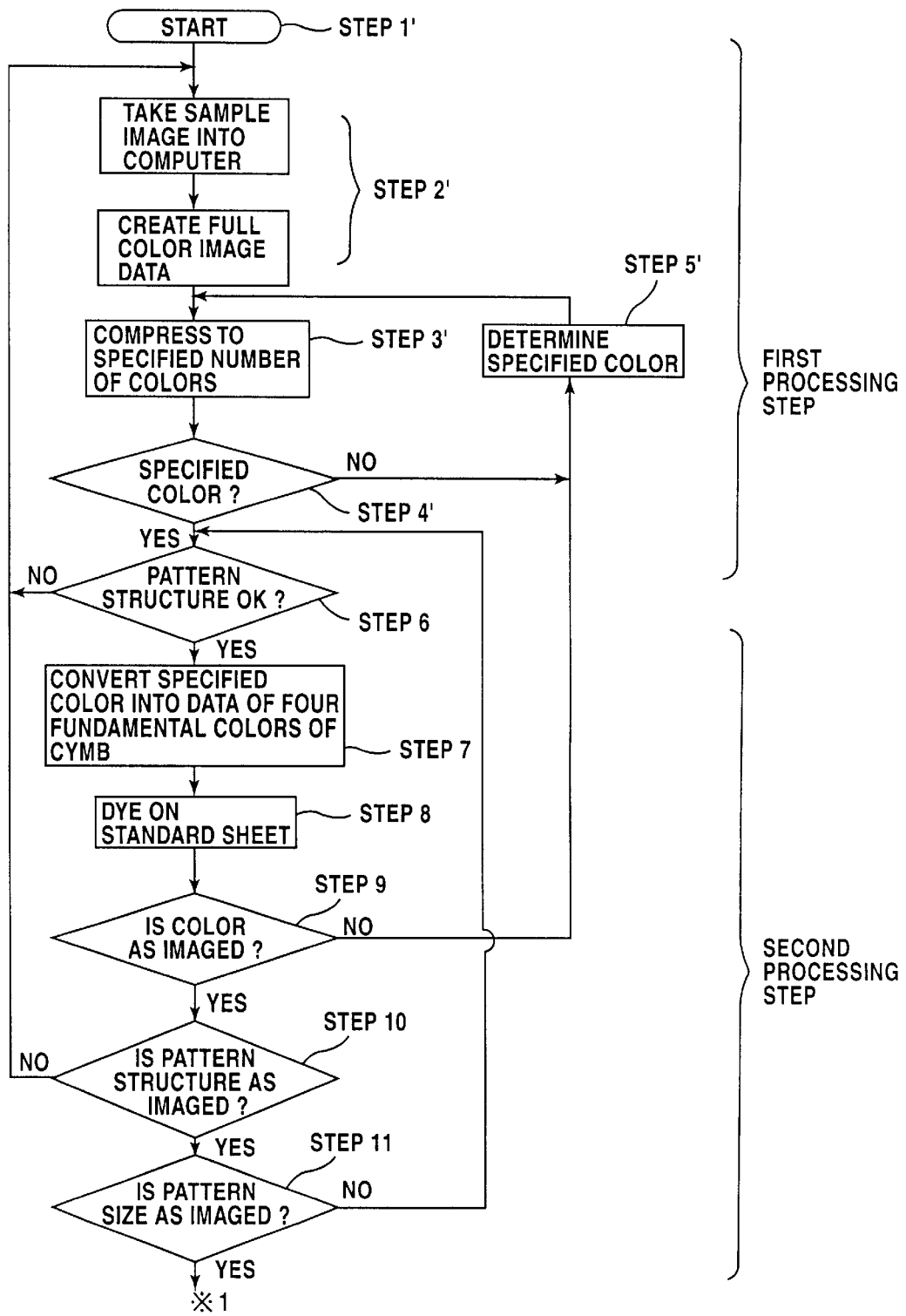
FIG. 6 is a part of a flow chart showing the procedure according to one embodiment of the inventive fashion design and production supporting method.
Figure 7:
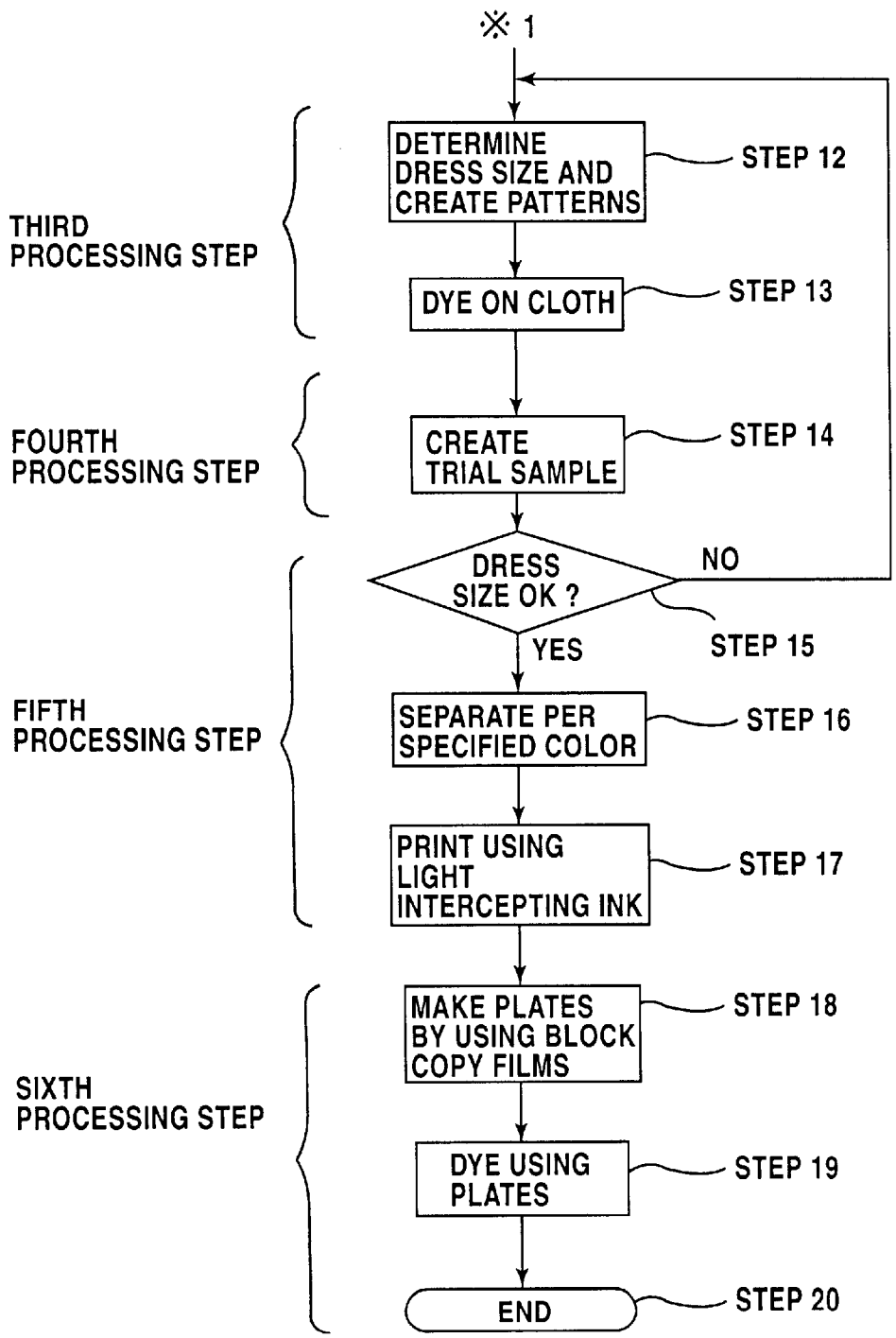
FIG. 7 is a part of a flow chart showing the procedure according to one embodiment of the inventive fashion design and production supporting method.

Flow charts shown in FIGS. 5 through 7 show the scheme of the processing steps from the fashion design to the actual production using the support system having such system structure. Its contents are roughly divided into the following first through sixth processing steps.

First Processing Step: Step of creating original data;

Second Processing Step: Step of defining a color pattern on the standard sheet;

Third Processing Step: Step of dyeing on a cloth in the exact size;

Fourth Processing Step: Step of fabricating a trial sample;

Fifth Processing Step: Step of fabricating a block copy film;

Sixth Processing Step: Step of textile printing in actual production.

First Processing Step: Step of creating original data (Step 2 through Step 6 or Step 2' to Step 6);

This processing step includes a method of creating original data on the computer A from the beginning by using a keyboard, a mouse and the like as shown in FIG. 5 and a method of reading prototype data by using an image scanner, a digital camera and the like as shown in FIG. 6. Here, the contents will be explained mainly based on the former.

Figure 8:
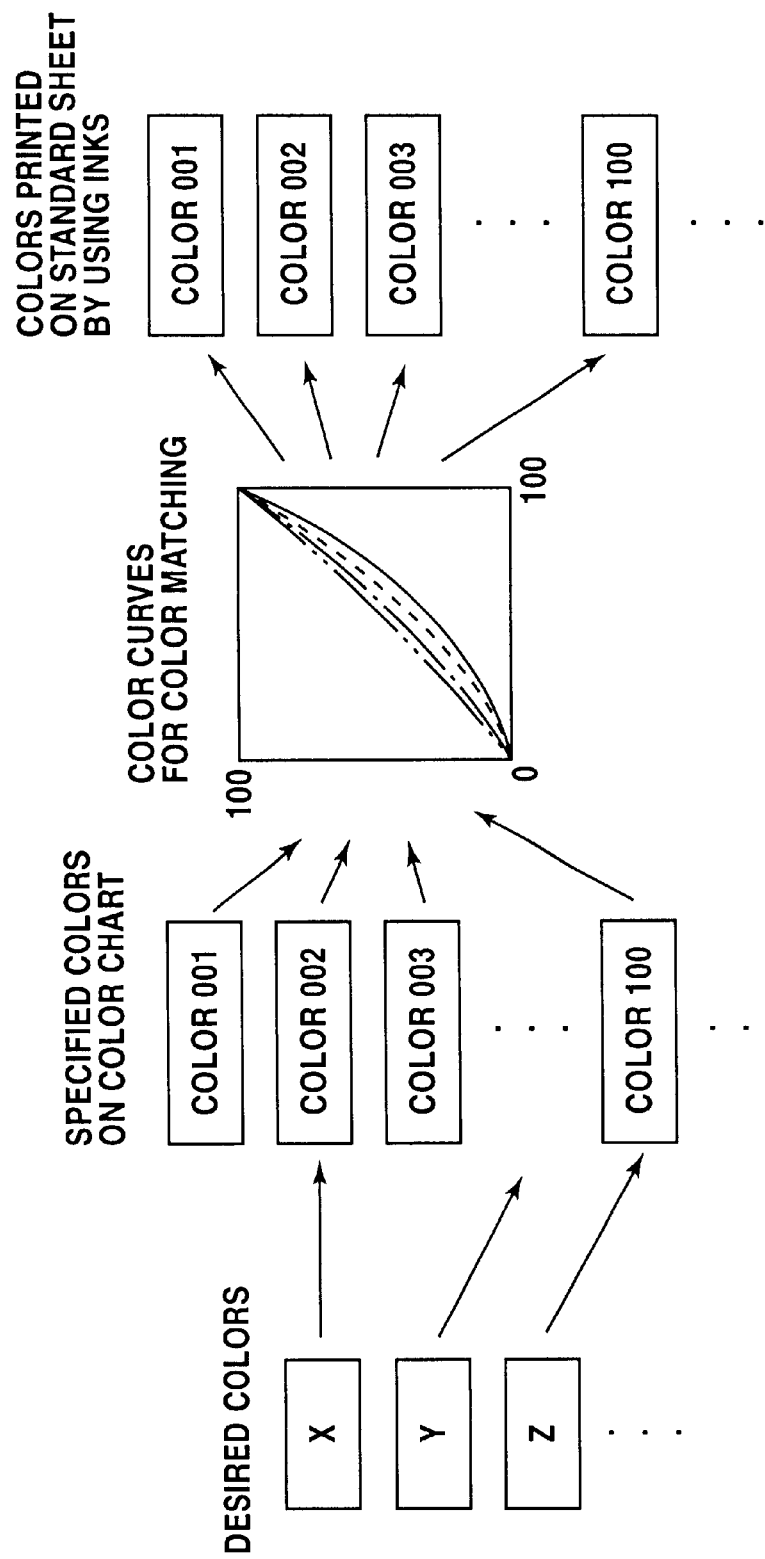
FIG. 8 is an explanatory diagram showing a procedure for converting a specified color, after applying desired colors selected by a client to the specified color, into the representation of network points by the four fundamental colors of CMYB.

At first, original data of a color pattern is created based on a concept of making a dress having what kind of color pattern. The original data is created while displaying editing processes on a display by using an image editing software. In concrete, data of a coloring boundary line which turns out to be pattern data is created within the computer by manipulating the mouse and keyboard and then a specified color is colored at each part of the pattern represented by the coloring boundary line. The specified color is colored by selecting the color desired by a client for example from the color chart and by specifying concretely the region where it is disposed. The specified color here means a "color" which can be handled by the present supporting system and a number of colors thereof is limited by a number of colors which can be used in the actual production. However, depending on an image processing capability of a computer, there is a case when a color displayed on the display screen cannot be caused to completely coincide with the specified color. In this case, colors which are close to the specified color are displayed as much as possible on the display screen and the color data of the specified color is controlled accurately as data within the computer. Even when the color displayed on the display screen is different more or less with the specified color, the coincidence of the color printed on the standard sheet by using the ink for printing the standard sheet with the specified color is guaranteed because the color data of the specified color is accurately controlled as the data within the computer as described later. FIG. 8 shows this state.

A number of specified colors are 20 to 30 and a concrete color is selected appropriately. The color pattern (pattern and color) thus set is displayed on the display screen to check whether the color of each part of the pattern is the specified color which the client has desired and whether the structure of the pattern is what has been planned. When the color pattern is successful, it is defined and when it is unsuccessful, the specified color is selected and the pattern is created again.

As another method for inputting the original data, there is the method of reading an image of a color pattern from a sample by using an image scanner, a digital camera and the like and creating original data by correcting the image thus read. In this case, the image data thus read is analyzed to extract a coloring boundary line and a number of colors colored within the region delimited by the coloring boundary line read in full color is subtracted to a number of colors which can be handled. In the present embodiment, a number of colors read in about 3,600,000 colors is subtracted to 2 to 30 colors. Then, the specified color is selected from the color chart to apply to the color after the subtraction. The subtraction of color to two colors here means that the original data in color is monotoned. Obtaining a monotoned color pattern from a sample represented in multiple colors also falls in the scope of application of the present invention.

Second Step: Step of defining a color pattern on the standard sheet (Step 7 through Step 11);

After obtaining an outline image, the standard sheet for evaluating the color pattern is set in the plotter B to print in the exact size by using the ink for printing the standard sheet. As the standard sheet, a white coated paper or the like having no vice and which can be colored is used because it is the standard in evaluating the color pattern. Inks of the four fundamental colors of CMYB are used and light intercepting ink which can be used in common also in printing on the block copy film is used specifically for black.

The process for printing on the standard sheet is implemented by converting each specified color colored in each part of the pattern in the original data into data of network points represented by the four fundamental colors of CMYB. FIG. 8 shows this state. For instance, when the colors required by the client are colors X, Y, Z, . . . , the colors closest to the colors X, Y, Z, . . . are selected on the color chart as specified colors 002, . . . and 100. The color matching data for reproducing the specified colors 001, 002, 003, . . . 100, . . . on the color chart by the network points represented by the four fundamental colors of CMYB is registered within the computer A in a shape of data for specifying amounts of ink or dye to be injected. This color matching data is used not only as data for controlling the amount of each color ink to be injected for printing on the standard sheet in the present step, but also as data for specifying the amount of dye to be injected in dyeing on the cloth for the trial sample.

When the color pattern is printed on the standard sheet, it is confirmed whether the color pattern thus printed conforms to the requirement of the client. When it conforms, the color pattern is defined and if not, the color, pattern and structure are corrected repeating the same procedure until the color pattern conforming to the requirement is obtained.

Third Step: Step of dyeing on a cloth in the exact size (Steps 12 and 13);

When the color pattern is defined, a dress cutting pattern is created using the color pattern as the ground pattern. The cutting pattern is created also on the display screen by using the image editing software. The cutting pattern may be created by making reference to a collection of patterns stored in the memory of the computer A.

After defining the cutting pattern, the cutting pattern is dyed using the color pattern defined in the second step as the ground pattern. The dyeing is implemented by setting the cloth on the plotter B and by replacing the ink for printing the standard sheet with the dye for dyeing the cloth for the trial sample. The dye used at this time is selected corresponding to the cloth to be dyed. The same cloth used in the actual production is used as the cloth to be dyed. While the cloth is set after removing the standard sheet, no dye tank needs to be replaced when there is no specific change in the cloth to be used because the plotter B is provided with both the ink and dye tanks. It is noted that it is within the scope of the invention to provide one or a plurality of tanks for storing special colors other than the ink and dye tanks of the four fundamental colors of CMYB which are always provided. For instance, this method is effective in adding a quiet color at part of a color pattern whose overall tone is flashy.

The color matching data used in the second step is used also in dyeing by the four fundamental colors of CMYB. Similarly to the case of inks, CMYB types of dyes are used. In order to guarantee that the same coloring state with the result of color obtained on the standard sheet can be obtained, one whose tint of each color dye of the four fundamental colors of CMYB matches with the tint of each color ink of the four fundamental colors of CMYB is used as much as possible. The contents of the coincidence of the tint has been described before.

Figure 9:
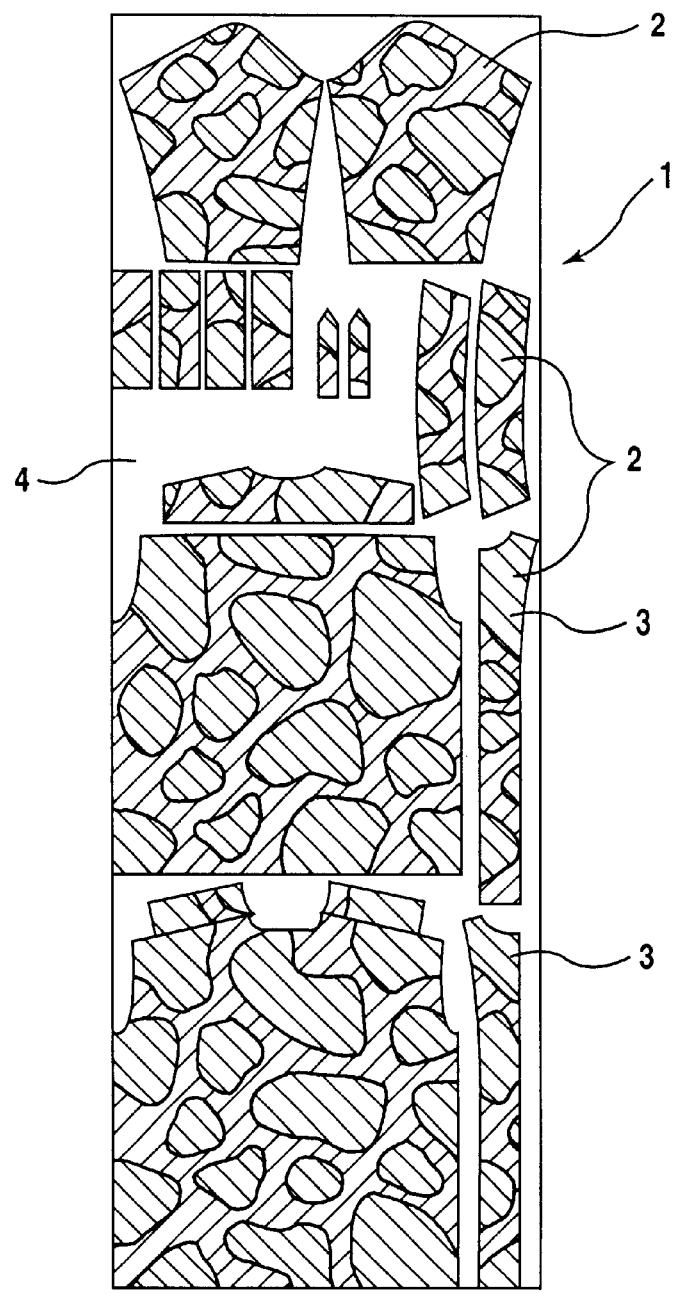
FIG. 9 is an explanatory drawing showing a cloth for a trial sample on which color patterns and cut patterns are dyed.

While the color pattern as the ground pattern 3 on the cloth 1 is dyed involving the cutting pattern 2 as shown in FIG. 9, only the inside of the outline of the cutting pattern 2 is dyed and the outside of the outline of the cutting pattern 2 is not dyed, remaining as white part 4.

Figure 10:
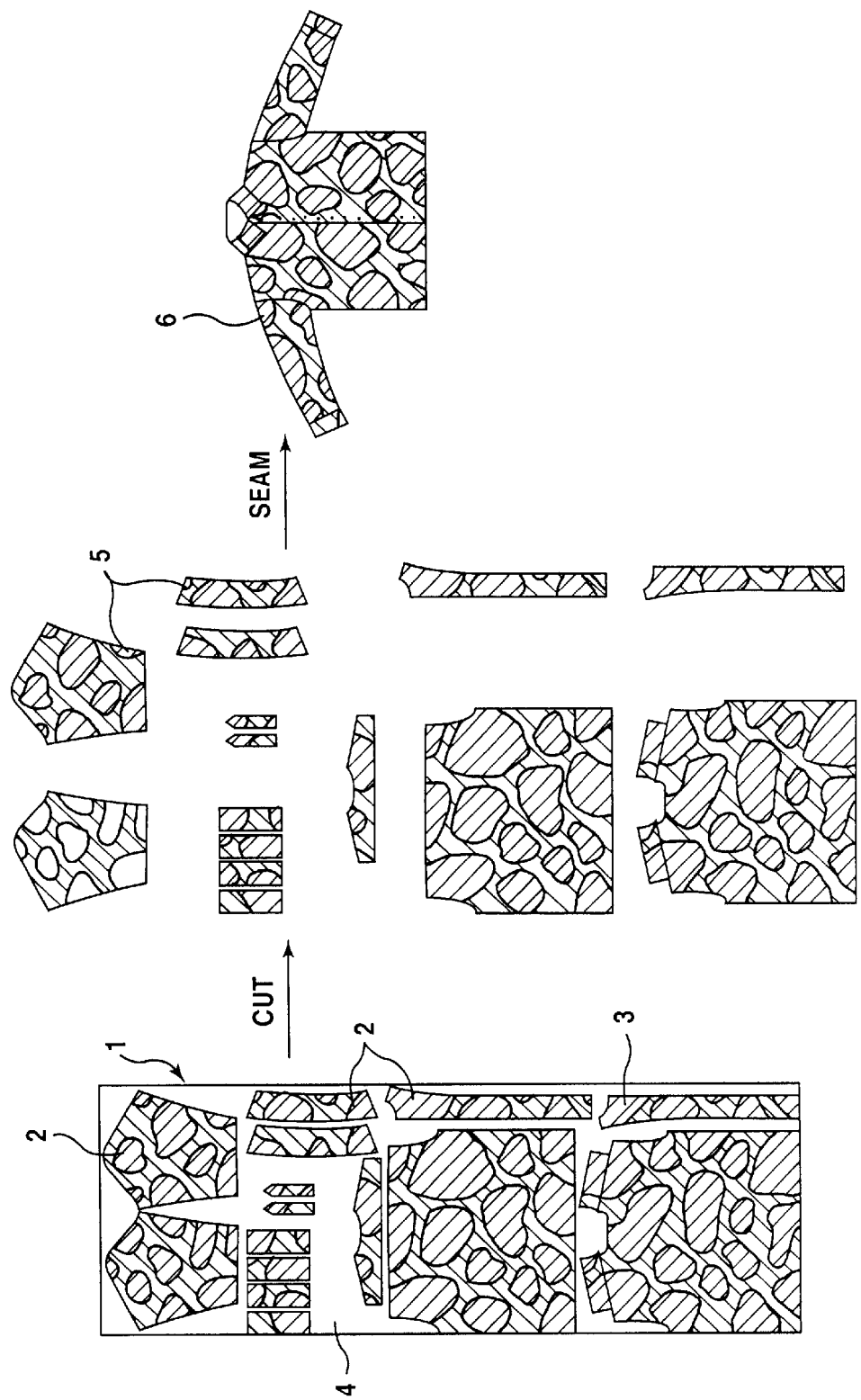
FIG. 10 is an explanatory drawing showing a procedure in which the cloth for the trial sample on which the color pattern and cut patterns are dyed is cut and becomes the trial sample via seaming.

Fourth Step: Step of fabricating a trial sample (Step 14);

After obtaining each part 5 by cutting the cloth thus dyed in accordance to the patterns, the trial sample 6 is fabricated by seaming these parts 5 as shown in FIG. 10.

Figure 11:
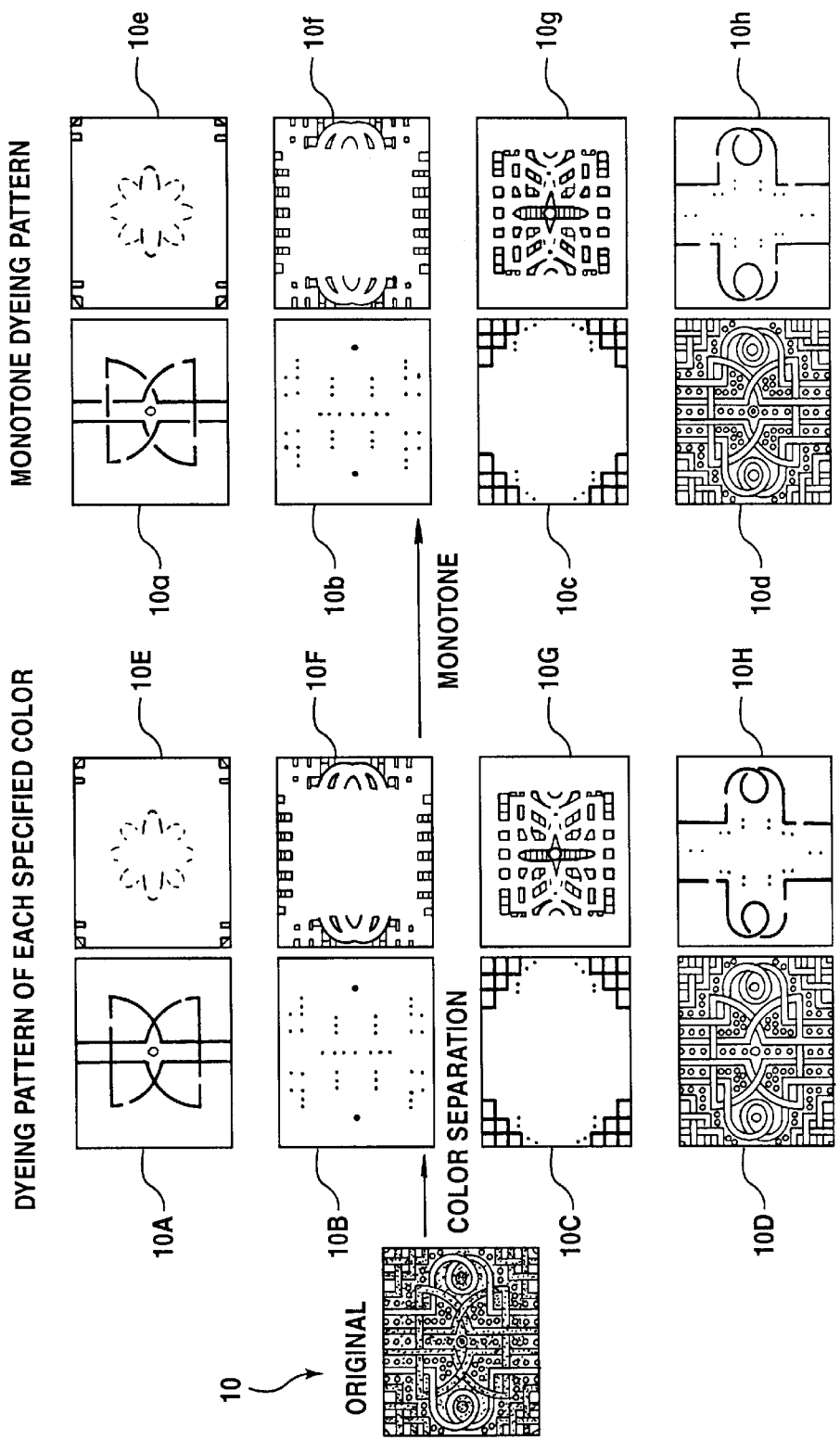
FIG. 11 is an explanatory drawing showing a procedure in which original drawings are monotoned after being color-separated per specified color and divided into plates.

Fifth Step: Step of fabricating a block copy film (Step 15 through Step 17);

The trial sample 6 thus obtained is evaluated and is discussed whether or not to put on the actual production line. When it is determined to put on the actual production line, a block copy film of a plate used in the screen printing in the actual production is prepared. In the preparation of the block copy film, an original 10 in which a plurality of colors exist mixedly is color-separated as shown in FIG. 11 based on a number of colors contained in the original 10 per each specified color to obtain dyeing patterns 10A through 10H per specified color and then printing on a material of the block copy film by using the light intercepting ink to obtain monotoned dyeing patterns 10a through 10h. Drawing on the material of the block copy film is carried out by setting the material of the block copy film on the plotter B and by using the light intercepting ink which is used in common also as the black ink among the ink for printing the standard sheet of the four fundamental colors of CMYB. The cutting pattern is reflected in the dyeing pattern on the material of the block copy film, though not shown in the figure because the color pattern is exaggerated here. That is, the dyeing pattern is drawn in each separated block copy film such that only the part where a color existed in the original cutting pattern is to be dyed in the textile printing in the actual production. Each color is dyed only to the inside of the outline of the respective dyeing patterns in the textile printing in the actual production and as a result of superimposing the dyes dyed by these plurality of block copy films, only the inside of the outline of the cutting pattern is dyed. However, it is not necessary to reflect the color chart on the block copy film if the effect of reducing the amount of dyes to be used is not required in the actual production. In this case, data for printing the whole sheet or data for printing a color pattern on the standard sheet is used as the original data for drawing o the block copy film.

Sixth Step: Step of textile printing in actual production (Steps 18 and 19);

The block copy films thus finished are handed to a platemaker to make a plate for screen printing for the actual production. There is a case when the data for preparing the block copy films is sent directly to the platemaker or a textile printing shop. To the textile printing shop, the standard sheet on which the color pattern is printed is handed together with the block copy films and plates. Workers of the shop prepare the dyes for printing in the actual production based on the color pattern represented on the standard sheet. While the color pattern printed on the standard sheet is used in the evaluation of the color pattern in the designing stage, it also becomes the reference in preparing the dyes for printing in the actual production. In that sense, the standard sheet guarantees the series of processes of the whole supporting system and may be named also as a "reference sheet".

Then, dyeing is carried out as the actual production in the dyeing shop by using the finished plate for screen printing. Similarly to the third processing step, the cutting patterns are dyed together with the color patterns, only the inside of the outline of the cutting pattern is dyed and the outside of the outline is not dyed and left as white also in the screen printing in the actual production. The appearance of the state of dyeing to the cloth is almost the same with that shown in FIG. 9 used as the drawing for explaining the third processing step. What is different is that while the color pattern is expressed by the set of points of each color dye by using the CMYB dyes in the third processing step, the dyeing is carried out by using the same number of block copy films with the specified colors separated per each specified color in this process. As described before, it is needless to say that the color pattern may be dyed across the whole cloth by using block copy films on which no cutting pattern is reflected without dyeing the cutting pattern as usual when no effect of reducing the amount of dye used in the textile printing in the actual production.

Thus, the cloth dyed in the color pattern of the image close to the original is finished.

Thereby, the use of the inventive supporting system allows the stages from the fashion design planning to the preparation of the block copy films just before the actual production to be all processed in one and the same office.

The fashion design and production supporting system described in claim 1 has the following effects.

(1) The series of processing steps from the design and planning of a fashion to the state of creating the block copy films just before the stage of the actual production can be processed within the same office without requiring labor of inputting data again and the like and a totally new textile printing system which can provide a cloth on which cutting patterns are drawn can be constructed. Because the conventional textile printing facilities of the actual production need not be changed at all, this method allows the conventional facilities to be used as they are, thus requiring less burden costwise in introducing the inventive method.

(2) Because the cloth which is used in the actual production can be dyed directly by using the drawing unit for drawing a planned design on a sheet member, the color pattern and design of the cloth may be evaluated including the feeling of the cloth by making a trial sample by using such cloth. Thereby, the design can be evaluated exactly and the development of design can be effective and fast. Because the cloth for the trial sample is dyed directly by the drawing unit such as a plotter, it is unnecessary to implement an actual production of a small lot just for obtaining block copy films, expensive plates for screen printing and the cloth for the trial sample in making the trial sample.

(3) Because the cutting patterns are dyed together with the color pattern in the dyeing in the actual production and only the inside of the outline of the cutting pattern is dyed, leaving the outside of the outline white considering as the out of the object of dyeing, an amount of dye used is reduced sharply, thus allowing the cost necessary for the production to be reduced considerably. Further, because the cutting patterns are dyed together with the color pattern, cutting miss may be prevented in cutting manually. Still more, because the parts disused after cutting are not dyed, there is no need of apprehension about the environmental pollution.

Further, the labor of creating the original data may be reduced by reading an image of a sample such as existing cloths, papers or pictures by image reading means and by creating the original data from the image thus read or based on that as described in claim 2.

It becomes unnecessary to provide color matching data for each different dye and cloth, a number of the color matching data may be reduced and the adequacy of estimating or evaluating the coloring state on the cloth for making the trial sample by the coloring state of inks on the standard sheet is guaranteed by causing the tint of each color ink for printing the standard sheet to coincide with tint of each color dyes for dyeing the cloth for making the trial sample and the color matching data used in printing on the standard sheet is caused to be used in common also as color matching data in dyeing on the cloth for making the trial sample as described in claims 5 and 6.

When the inks of the four fundamental colors for printing the standard sheet and the dyes of the four fundamental colors for dyeing the cloth are both provided in one drawing unit for drawing sheet members and the same color ink and dye are injected from a common injection nozzle as described in claim 7, the conditions for injecting the ink and dye may be equalized, so that the adequacy of estimating or evaluating the coloring of the dye on the cloth for making the trial sample by the coloring state of the ink on the standard sheet is enhanced further and the system can be easily handled and maintained.

When the light intercepting ink used in making the block copy film is used in common as the black ink among the inks for printing the standard sheet as described in claim 8, the ink for drawing the block copy film needs not be provided separately, so that the size of the drawing unit may be reduced and the maintainability thereof is improved further.

In addition to the effects realized by the technological contents described in claim 1, the supporting system described in claim 13 can be easily handled and maintained by arranging such that the same color ink and dye are injected from the common injection nozzle.

The supporting system described in claim 14 exhibits the same effect with those realized by the technological contents described in claim 2, the supporting system described in claim 15 exhibits the same effect with those realized by the technological contents described in claim 5, the supporting system described in claim 16 exhibits the same effect with those realized by the technological contents described in claim 7, and the supporting system described in claim 17 exhibits the same effect with those realized by the technological contents described in claim 8.

While preferred embodiments have been described, variations thereto will occur to those skilled in the art within the scope of the present inventive concepts which are delineated by the following claims.

What is claimed is:

1. A fashion design and production supporting method, comprising steps of:

creating data of a coloring boundary line of a pattern and original data in which color data is given to each part of said pattern by coloring a selected and specified color within a region delimited by said coloring boundary line;

converting the color data of each specified color colored to each part of said pattern into data of network points represented by the four fundamental colors of cyan, magenta, yellow and black in order to reproduce said specified color of each part of said pattern on a sheet member by using a drawing unit having a system of representing halftones on the sheet member by congregating the four fundamental colors in the shape of the network points, printing a color pattern on a standard sheet for evaluating color patterns in the exact size by using inks of the four fundamental colors in accordance to the data and defining the color pattern on the standard sheet after evaluating the color pattern printed on the standard sheet;

making a cutting pattern of a dress using said defined color pattern as a ground pattern;

converting the color data of each specified color colored in each part of said pattern into the data of network points representanted by the four fundamental colors to dye said color pattern and cutting pattern on the same cloth with that used in the actual production in the exact size by using dyes of the four fundamental colors in accordance to the data of said network points, the data of said cutting pattern and data of size of the dress while dyeing only the inside of an outline of said cutting pattern and without dyeing the outside thereof;

making a trial sample by cutting and seaming said cloth thus dyed;

defining said cutting pattern and color pattern after evaluating said trial sample thus made and making block copy films for textile printing in the actual production, each of which is printed by color-separating and monotoning the original data per each specified color based on a number of colors contained in the original data and in which said cutting pattern is reflected, by the same number with the number of colors contained in the original data by using said drawing unit; and making plates for screen printing in the actual production by using said block copy films and dyeing only the inside of the outline of said cutting pattern without dyeing the outside by using those plates in the actual production.

2. The fashion design and production supporting method according to claim 1, wherein the contents of the step of creating the original data comprises steps of reading a color pattern of a sample to be referenced in full color by an image reader to create data of coloring boundary line from the color pattern thus read, subtracting a number of colors in the full color state colored within the region delimited by said coloring boundary line to a number of colors which can be handled and specifying specified colors close to the colors after the subtraction to give color data to each part of the pattern.

3. The fashion design and production supporting method according to claim 1 or claim 2, wherein said specified color is selected from a color chart in which a number of color is limited.

4. The fashion design and production supporting method according to claim 1 or 2, wherein a data table for color matching for converting color data of the specified color to data represented by network points by four fundamental colors is prepared beforehand to convert the color by making reference to said data table.

5. The fashion design and production supporting method according to claim 4, wherein a tint of each color ink used in printing on a standard sheet for evaluating color patterns in the printed state is made to coincide with a tint of each color dye used in dyeing on the same cloth with that used in the actual production in the dyed state as much as possible and color matching data used in printing on the standard sheet for evaluating color patterns and color matching data used in dyeing on the cloth are shared.

6. The fashion design and production supporting method according to claim 4, wherein a tint of each color ink itself used in printing on a standard sheet for evaluating color patterns before printing is made to coincide with a tint of each color dye itself used in dyeing on the same cloth with that used in the actual production before dyeing as much as possible and color matching data used in printing on the standard sheet for evaluating color patterns and color matching data used in dyeing on the cloth are shared.

7. The fashion design and production supporting method according to claim 1 or 2, wherein the four fundamental colors for printing the standard sheet and the four fundamental colors for dyeing the cloth are both provided in one unit for drawing a sheet member and the same color ink and dye are injected from a common injection nozzle.

8. The fashion design and production supporting method according to claim 1 or 2, wherein light intercepting ink is used in preparing block copy films and said light intercepting ink is used in common as black ink among inks for printing the standard sheet.

9. The fashion design and production supporting method according to claim 1 or 2, wherein conditions for dyeing on the cloth for trial sample using dyes of the four fundamental colors of CMYB and dyeing conditions in textile printing in the actual production are determined bas ed on the color pattern reproduced on the standard sheet by using inks of the four fundamental colors of CMYB and defined.

10. The fashion design and production supporting method according to claim 1 or 2, wherein acidic dye is used when the cloth for the trial sample is silk, nylon textile and wool textile, disperse dye is used when the cloth for the trial sample is polyester textile, reactive dye is used when the cloth for the trial sample is cotton, rayon textile and hemp textile and cation dye is used when the cloth for the trial sample is acrylic textile.

11. The fashion design and production supporting method according to claim 1 or 2, wherein a single or a plurality of special colors other than the four fundamental colors of CMYB is added.

12. A fashion design and production supporting method, comprising steps of:

creating data of a coloring boundary line of a pattern and original data in which color data is given to each part of said pattern by coloring a selected and specified color within a region delimited by said coloring boundary line;

converting the color data of each specified color colored to each part of said pattern into data of network points represented by the four fundamental colors of cyan, magenta, yellow and black in order to reproduce said specified color of each part of said pattern on a sheet member by using a drawing unit having a system of representing halftones on the sheet member by congregating the four fundamental colors in the shape of the network points, printing a color pattern on a standard sheet for evaluating color patterns in the exact size by using inks of the four fundamental colors in accordance to the data and defining the color pattern on the standard sheet after evaluating the color pattern printed on the standard sheet;

making a cutting pattern of a dress using said defined color pattern as a ground pattern;

converting the color data of each specified color colored in each part of said pattern into the data of network points represented by the four fundamental colors to dye said color pattern and cutting pattern on the same cloth with that used in the actual production in the exact size by using dyes of the four fundamental colors in accordance to the data of said network points, the data of said cutting pattern and data of size of the dress while dyeing only the inside of an outline of said cutting pattern and without dyeing the outside thereof;

making a trial sample by cutting and seaming said cloth thus dyed;

defining said cutting pattern and color pattern after evaluating said trial sample thus made and making block copy films for textile printing in the actual production for dyeing the color pattern across the whole cloth, each which is made by color-separating and monotoning the original data per each specified color based on a number of colors contained in the original data, by the same number with the number of colors contained in the original data by using said drawing unit; and making plates for screen printing in the actual production by using said block copy films and dyeing the color pattern across the whole cloth by using said plates in the actual production.

13. A fashion design and production supporting system, comprising:

means for creating data of a coloring boundary line of a pattern and original data in which color data is given to each part of said pattern by coloring a selected and specified color within a region delimited by said coloring boundary line;

a drawing unit, having a system of representing halftones on a sheet member by congregating the four fundamental colors of cyan, magenta, yellow and black in the shape of network points and carrying inks of four fundamental colors for printing on a standard sheet for evaluating color patterns and dyes of four fundamental colors for dyeing a cloth, for drawing on the sheet member by switching and injecting the same color ink and dye through a common nozzle;

color converting means, having a color matching data table for representing said specified color by the network points represented by the four fundamental colors of CMYB, for converting each specified color into data of an amount of ink and dye of four fundamental colors to be injected by making reference to said data table;

cutting pattern creating means for creating a cutting pattern of a dress in which the original data created by said original data creating means and defined through the evaluation of color pattern on the standard sheet is used as the ground pattern; and display means for displaying on a screen the whole or part of the process for creating the original data by said original data creating means, the color conversion process by said color conversion means and the process for creating the cutting pattern by said cutting pattern creating means.

14. The fashion design and production supporting system according to claim 13, wherein said original data creating means comprises:

an image reader for reading a color pattern of a sample in full color; and a mechanism for creating data of a coloring boundary line from said color pattern thus read and subtracting a number of colors in the full color state colored within a region delimited by said coloring boundary line to a number of colors which can be handled to specify a specified color close to a color after the subtraction.

15. The fashion design and production supporting system according to claim 13 or 14, wherein a tint of each color ink used in printing on a standard sheet for evaluating color patterns in the printed state is made to coincide with a tint of each color dye used in dyeing on the same cloth with that used in the actual production in the dyed state as much as possible and color matching data used in printing on the standard sheet for evaluating color patterns and color matching data used in dyeing on the cloth are shared.

16. The fashion design and production supporting system according to claim 13 or 14, wherein the inks for printing the standard sheet and the dyes for dyeing the cloth are both provided in a drawing unit and the same color ink and dye are injected from a common injection nozzle.

17. The fashion design and production supporting system according to claim 16, wherein light intercepting ink used in creating block copy films is used in common as black ink among inks for printing the standard sheet.

* * * * *